Nov. 29, 1966 M. H. CRAVEN 3,288,163
WIPER RING FOR A FLUID SYSTEM FLOW INTERRUPTING DEVICE
Filed Sept. 5, 1963 2 Sheets-Sheet 1

INVENTOR.
MILTON H. CRAVEN
BY Edward B Gregg
ATTORNEY

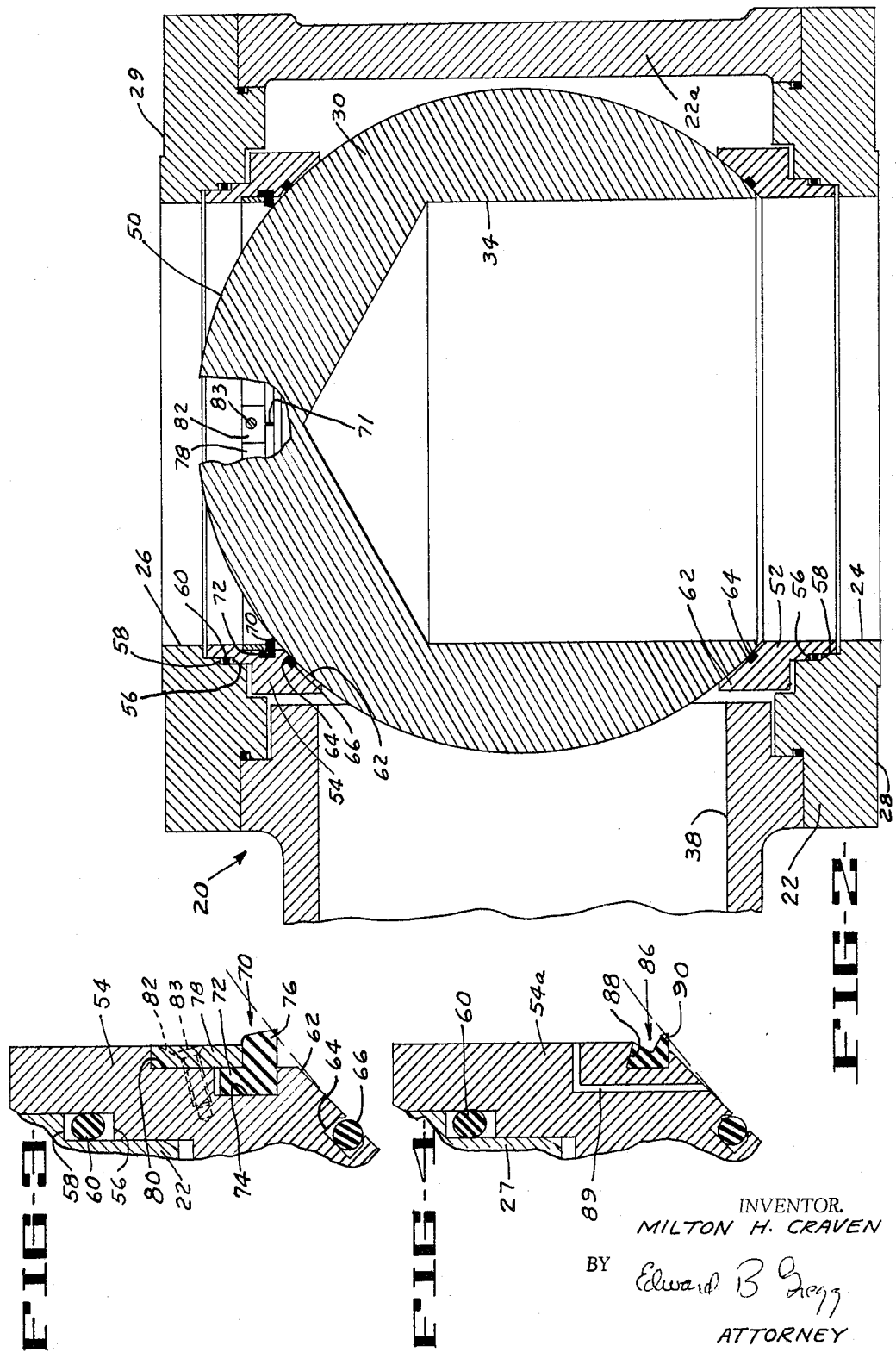

United States Patent Office 3,288,163
Patented Nov. 29, 1966

3,288,163
WIPER RING FOR A FLUID SYSTEM FLOW INTERRUPTING DEVICE
Milton H. Craven, Houston, Tex., assignor to Grove Valve and Regulator Company, Oakland, Calif., a corporation of California
Filed Sept. 5, 1963, Ser. No. 306,787
7 Claims. (Cl. 137—242)

This invention relates to a wiper ring for a fluid system flow interrupting device and, more particularly, to a wiper ring which is adapted for use in a ball valve type of structure having a rotatable ball interposed in a fluid passageway in order to prevent the dispersal of dirt and foreign particles to which the surface of the rotatable ball is exposed.

In many fluid transmission systems, such as pipelines, means are provided for introducing a solid article into the transmission system so that it may be carried along the pipe by the flowing fluids to perform a given function. For example, such solid articles may be employed to separate different fluids being transmitted successively but simultaneously, along the same line, or to determine flow rate by measurement of its own rate of movement. In one such system a U-shaped meter prover loop is installed in the pipeline, with both legs of the loop being connected by a cross communicating conduit in which is installed a device for introducing an article at one end of the meter prover loop and receiving it as it arrives at the other end. This device, sometimes called a transfer chamber may take the form of a structure of the general type found in ball valves except that the bore in the rotatably mounted ball extends only partially therethrough to form a pocket and the housing is provided with a door which may be opened to the exterior for placement therein of a solid member such as a sphere. Thus, with the ball turned to expose the pocket to the outside door, a sphere, often in the form of a large inflated rubber ball, may be inserted in the pocket of the ball which is then rotated partially to expose the pocket to that branch of the communicating passage which opens into the entrance side of the meter prover loop. Then, the spherical article is carried around the loop by the fluid flowing therein and the time of its movement between spaced detectors is measured and recorded in order to determine flow rate and to check meter accuracy. After the spherical article passes around the loop, it is deflected at the outlet side by a perforated grating into the return branch of the cross communicating branch which is open thereto while the fluid itself passes through the grating and flows on through the system. At this time the pocketed ball is turned with its pocket exposed to the return branch to receive the returning sphere.

Such systems have proved effective but a difficulty has been experienced in the accumulation on the surface of the ball of dirt and other foreign particles that are carried along the pipeline by the spherical article, or are deflected from the grating to fall by gravity into the vertical return branch. With dirt and foreign matter so accumulated subsequent rotation of the ball within the housing may produce a scratching and abrasion of the flexible seals and the smoothly polished metal sealing surfaces.

It is, therefore, an object of this invention to provide in a rotary ball flow blocking device, means for preventing the dispersion of foreign substances over the surface of the rotating ball.

It is a further object of this invention to provide a device for confining such foreign substances as may be deposited on a rotary flow blocking member to that portion of its housing that is contained within the area circumscribed by the sealing surfaces between the housing and the flow blocking member.

It is a further object of this invention to provide a wiper ring for excluding dirt and foreign substances from the annular seal surfaces around a flow passage of a ball transfer chamber, which wiper ring is simple in construction and reliable in operation.

In carrying out this invention, I provide in a ball valve type structure having engageable annular sealing surfaces surrounding the flow passageway on the housing and the rotatable ball, respectively, a resilient wiper ring having a base of large cross section for stable mounting in the housing around the flow passageway and a protruding wiper portion of smaller cross section which will yieldably engage the surface of the ball to prevent passage of dirt particles and other foreign matter outside of the circular area defined thereby. Since the wiper ring is mounted around the flow passageway but is of a diameter smaller than that of the annular sealing surfaces, it confines substantially all dirt and other foreign matter that may enter the flow passageway to an area within and spaced from the sealing surfaces.

Other objects and advantages of this invention will become apparent from the specification following when read in conjunction with the accompanying drawings wherein:

FIG. 2 is a section view of a transfer device embodying features of this invention; and FIGS. 3 and 4 are enlarged partial section views of seat rings including seals and wiping rings of this invention.

Figure 1:
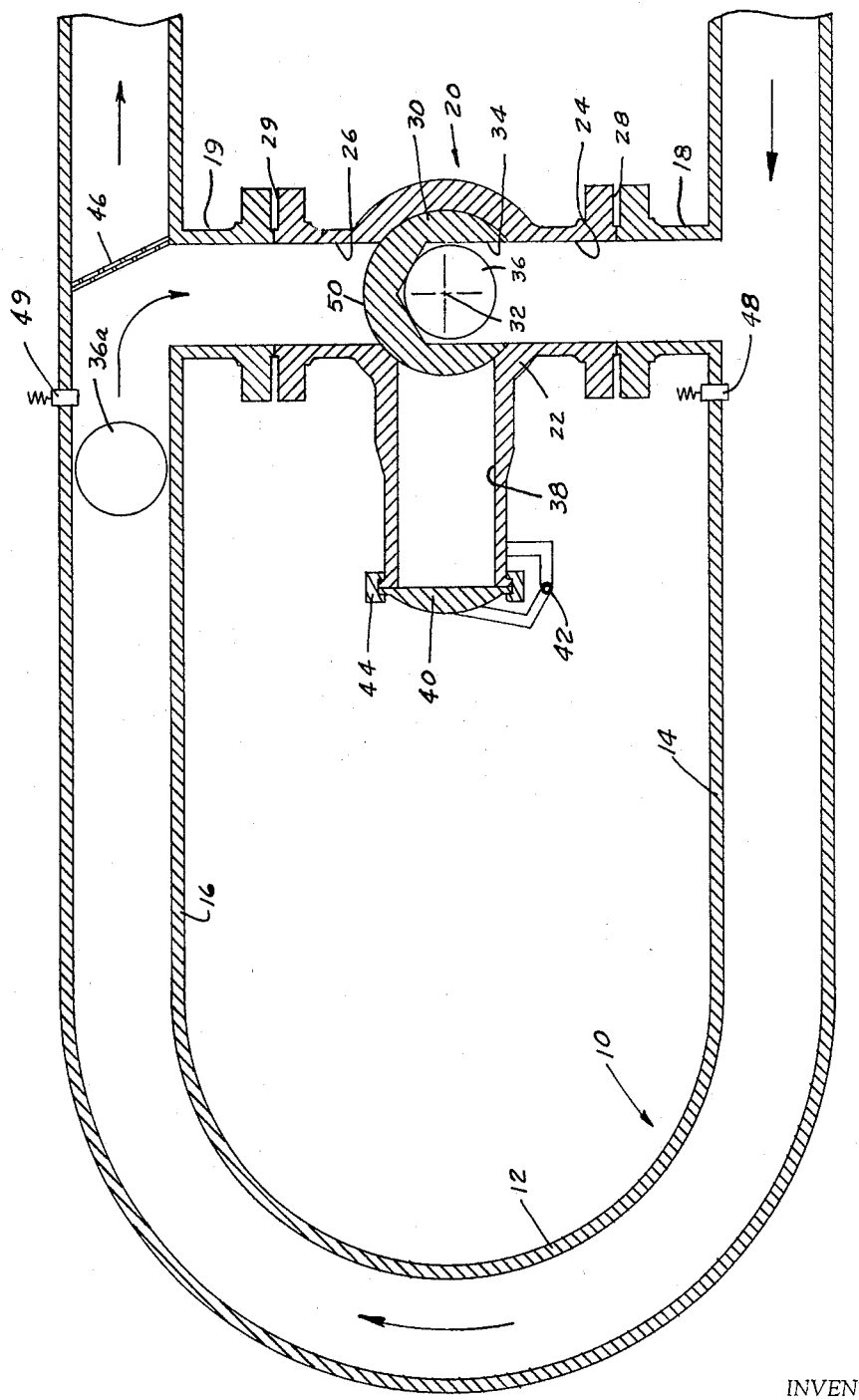
FIG. 1 is a vertical section view in more or less schematic form showing a fluid transmission system including a spherical article transfer device.

Referring now more particularly to FIG. 1, there is shown a fluid transmission system including a pipeline 10, a section of which is formed into a loop 12 forming incoming leg 14 and return leg 16 that are connected by the inlet and return branches 18 and 19 of a cross, communicating pipe. Interposed between the inlet and return branches of the communicating pipe is a test article transfer device 20. The test article transfer device preferably assumes the general configuration of a ball valve including a body 22 having axially aligned flow passages 24 and 26 that terminate in suitable means, such as the flanges 28 and 29 for connection into the cross communicating line 18, 19.

Within the body 22 is a ball 30 that is rotatable therein about an axis 32 for movement into any of three selected positions hereinafter to be described. Instead of the usual through passageway of a ball valve, the ball of the article transfer device is bored only partially to form a pocket 34 into which the article such as the sphere 36 shown may be contained.

The transfer device is also provided with a third passageway 38 the end of which is closed by a door 40 which may be mounted on hinges 42 and which is adapted to be sealed shut by any suitable means, such as a split flange member 44. Thus, with the ball 30 rotated so that the pocket is disposed horizontally in alignment with the access passage 38, the door 40 may be opened and the spherical article placed within the pocket 34. Then the ball 30 may be rotated to the downward position shown wherein the sphere is carried out the injection branch 18 and into the pipeline 10 to be carried around the meter prover loop 12 through the upper, return leg 16. After traversing the loop 12 the sphere 36a is deflected downward by an inclined, perforated grating 46 into the downward return portion 19 of the cross conduit into the pocketed ball 30 of the transfer device 20. The ball is at this time turned 180° from the position shown in FIG. 1 so that the pocket is upwardly disposed. When the sphere 36a is received in the pocket 36 the ball 30 may, if desired, be turned 90° for removal of the sphere through the hinged door 40.

A system as here described is an effective device for checking meters which measure the volume of liquid being transmitted. Thus, a pair of detectors 48 and 49 of any suitable type may be installed at spaced intervals along the meter prover loop 12. The detectors 48 and 49 are adapted to be tripped by the spherical article 36 to record the instant it passes the beginning and the instant it reaches the terminus of a measured loop. Then, the elapsed time may be recorded to determine the rate of flow from which the volume of fluid flow may be calculated.

In systems of the type just described, there is a tendency for dirt and other foreign matter to gravitate down the vertical return portion of the cross line and collect on the upper exposed surface 50 of the ball 30. Such foreign matter is carried along the prover loop 12 of the pipeline by entrainment in the fluid and, also, by the scrubbing action of the sphere 36 against the walls of the pipeline. Then, when some of the dirt and other foreign matter particles reach the juncture with the vertical connector line 19 they may simply drop into the vertical line by gravity, while other particles in the fluid may be deflected downward from the grating 46 into the line. In any event, with the transfer device ball 30 in the position shown such dirt and foreign particles will collect on the upper, exposed surface of the ball and, in absence of any preventive devices such as here contemplated, the particles may be distributed over its surface as it is subsequently to abrade and scratch the finely polished surfaces of the ball and housing or to cut the flexible seals that are commonly employed in such devices.

Referring now to FIG. 2 there is shown in an enlarged view, the housing including flow passages 24 and 26, the access door passage 38 and a cover plate 22a closing the fourth side of the housing 22. Surrounding each of the flow passages 24 and 26 is a seat ring 52, 54 which is formed of stepped construction so as to provide a radial shoulder 56 that is opposed by an internal radial shoulder 58 within the valve body. The shoulders 56 and 58 provide a recess between them within which is contained an O-ring 60 or similar resilient seal to prevent leakage of fluid around the seat ring 52 or 54. The seat rings are each formed with a sealing face 62 that accommodates and is complementary to the spherical surface 50 of the ball 30 with which it co-acts for sealing purposes. Customarily, there are annular engageable sealing surfaces between the seat rings 52, 54 and the spherical surface 50 of the ball and, for that purpose in the device shown, the generally conical sealing face of the seat ring 62 is provided with an annular recess 64 that contains a resilient seal ring 66, preferably of the O-ring type. The O-ring seal is compressed between the bottom of the recess and the spherical surface 50 of the ball to provide an annular seal against leakage of fluid from the flow passages 24 and 26.

If as previously described, dirt and other foreign particles drop down the vertical conduit 19 and enter the upper flow passage 26 to become deposited on the surface 50, such particles will be distributed over the valve body 22 and particularly under the seat rings 52 and 54, to abrade and scratch the finely polished surfaces of the seat rings and the ball and to cut resilient seals 66. In order to prevent such damage, I provide on at least the upper seat ring 54 an annular wiper ring 70 that is concentric with, and contained within, the upstream resilient seal ring 66.

Referring to the wiper ring 70 shown in FIGS. 2 and 3, it preferably comprises a base portion 72 of large cross section presenting a fairly substantial and somewhat rigid body to facilitate its retention in a recess 74 formed within the seat ring. Then, extending from the rigid base portion is a wiper section 76 of thinner cross section that extends outward from the seat ring 50 lightly to engage the spherical surface 50 of the ball 30 to prevent passage of dirt and similar particles but preferably not to seal against fluid pressure for reasons hereinafter to be described.

In the FIGS. 2 and 3 embodiment, the wiper ring is retained by means of a split retention ring 78, that is normally of a diameter to fit the recess 80 formed in the seat ring 54, but which may be compressed by pushing the split sections together for insertion of the retention ring through the flow passage 26. Then, a retainer block 82 is fastened to the seat ring as by means of a screw 83 to prevent subsequent compression of the seat ring, and hence, to lock the retention ring against inadvertent removal.

It is apparent that with the wiper ring extending from the seat ring 54 and with no way for dirt or other particles to pass behind the seat ring, all such particles that enter the body 22 through the flow passage 26 will be confined within the wiper ring 70. Then as the ball 30 is rotated such particles that accumulate on the surface 50 will be confined within the area circumscribed by resilient wiper and thereby prevented from entering under the seat ring 54. When the ball 30 is rotated to bring the pocket 34 into its upwardly exposed position such particles may be scraped into the pocket without damage to either polished or soft surfaces.

Preferably, the wiper ring is rendered incapable of sealing against fluid flow so that the sealing action around the flow passage 36 is effected by, and only by, the O-ring seal 66. This is essential in the particular structure shown because the diameters of the O-rings 60 and 66 behind the seat ring 54 and in the sealing face 62 and accurately determined and selected in order to provide a particular relationship between areas on the radially inward and outward sides of the two seal rings 60 and 66, so that the fluid pressures to which the seat ring 54 is exposed on both radially inward and outward sides will produce a total force relationship that tends to urge the seat ring into sealing engagement with the ball 30, as is more fully described in United States Patent No. 2,796,230 granted June 18, 1957 for "Valve Construction." In order that the wiper ring 70 will not interfere with the relative areas isolated by the seals 60 and 66 it is preferably arranged to permit pressure communication across it. Thus, the wiper ring 70 need not be a continuous member, so that a pressure communication port is formed between the adjacent ends 71 thereof. Alternatively such ports may actually be cut or molded into the wiper ring. But however the ports are formed, they are preferably located in the vertical plane of the axis of rotation of the ball 30 where particles on the ball would move tangentially with respect to the wiper ring 70. In the case of a ball that is mounted to move in opposite directions between its extreme positions, rather than in a complete rotation, the wiper ring 70 may be interrupted on the side thereof that does little wiping. That is, if in the structure shown in FIG. 2 the ball rotates in a clockwise direction to bring the pocket 34 to its top position the ring 70 may be ported on the left side.

Obviously, there are other ways in which the wiper ring may be rendered inoperative as a seal. For example, as shown in FIG. 3 the base 72 of the wiper ring need not be tightly engaged by the retainer ring 78 so that a path for pressure communication is formed within the recess 74 around the base of the wiper ring. Also, the engagement of the wiper ring 70 against the spherical surface 50 of the ball 30 may be under such light pressure that a seal is not maintained against fluid pressure.

Referring now to FIG. 4 a second form of wiper ring 86 is shown embodying a generally trapezoidal shaped base 86 that is bonded or otherwise secured within a complementary recess 88 formed in the seat ring 54a. This form of seat ring has an integral flexible extension 90 of gradually diminishing cross section that applies in light, yielding wiping action against the ball without sealing against fluid flow. Preferably, a passageway 89 is bored through the seat ring 54a to provide a pressure by-pass around the wiper ring 86 to the seal 66 from a point in the passageway that is above the maximum probable level of foreign matter accumulation.

While this invention has been described in connection with preferred embodiments thereof, it is apparent that modifications and changes therein may be made by one skilled in the art without departing from the spirit and scope of this invention as defined by the claims appended hereto.

Having described my invention, I claim:

1. In a flow obstructing device adapted for installation in a fluid transmission line and including a housing, a fluid conduit opening into said housing, and an inner member rotatably mounted in said housing, said inner member being circular in cross section in planes perpendicular to its axis of rotation, the outer surface of said inner member being conditioned to block said fluid conduit opening in one rotational position of said inner member, the combination therewith of:

an annular, substantially rigid seat ring slidably carried in said housing around said fluid conduit opening, a main resilient seal ring carried by said seat ring to seal against a complementary sealing outer surface on said inner member, a second resilient seal ring carried by said seat ring to seal against said housing, the diameters of said main and second seal rings being related so as to provide a differential in areas exposed to line pressure producing a force which biases said seat ring into sealing engagement with said inner member, an annular resilient wiper member mounted on said seat ring in wiping engagement with said outer surface of the inner member, said wiper member being disposed around said fluid conduit opening but within the area circumscribed by said main resilient seal ring, and a fluid pressure by-pass passageway connecting said fluid conduit and the space between said wiper member and said main seal ring.

2. The combination defined in claim 1 wherein said wiper member has in cross section a wide base portion secured in said seat ring and a narrow flexible extension engageable with said inner member, 3. The combination defined in claim 2 including an annular recess within said seat ring surrounding said fluid conduit opening but embraced by said main resilient seal ring, and means securing the wide base portion of said wiper member in said annular recess.

4. The combination defined in claim 2 including an annular recess within said seat ring surrounding said fluid conduit opening but embraced by said main resilient seal ring, the wide base portion of said wiper member being positioned in said recess, a split ring in said seat ring engaging said wide base portion and retaining it within said recess, said split ring being radially compressible to release said wiper member and for removal thereof from said seat ring, and a spacer block secured between the ends of said split ring.

5. The combination defined by claim 1 wherein said inner member is of generally spherical configuration.

6. The combination defined by claim 1 wherein said by-pass passageway is substantially confined to the plane containing a diameter of said fluid conduit and the axis of rotation of said inner member.

7. The combination defined by claim 1 wherein said by-pass passageway comprises an interruption of said wiper member in the portion thereof opposite to direction of inner member rotation.

References Cited by the Examiner

UNITED STATES PATENTS

| | | | |
|---|---|---|---|
| 1,788,358 | 1/1931 | Goerg | 137—513.7 |
| 2,138,446 | 11/1938 | Douredoure | 137—513.7 |
| 2,213,998 | 9/1940 | Sifkowitz | 137—242 |
| 2,497,448 | 2/1950 | Grosboll | 251—309 X |
| 2,516,947 | 8/1950 | Blevans | 251—315 |
| 2,606,740 | 8/1952 | Allen | 251—314 X |
| 2,866,213 | 12/1958 | McArthur | 251—172 X |
| 2,991,043 | 7/1961 | Saar | 251—306 |
| 3,002,525 | 10/1961 | Grove | 137—242 |
| 3,077,902 | 2/1963 | Vickery | 251—315 X |
| 3,144,040 | 8/1964 | White | 251—171 X |
| 3,186,014 | 6/1965 | Allen | 137—242 X |

WILLIAM F. O'DEA, *Primary Examiner.*

CLARENCE R. GORDON, *Examiner.*